(12) United States Patent
Song et al.

(10) Patent No.: US 10,317,743 B2
(45) Date of Patent: Jun. 11, 2019

(54) LIQUID CRYSTAL PANEL AND LIQUID CRYSTAL DISPLAY DEVICE

(71) Applicant: Shenzhen China Star Optoelectronics Technology Co., Ltd., Shenzhen, Guangdong (CN)

(72) Inventors: Yanjun Song, Guangdong (CN); Yongchao Zhao, Guangdong (CN); Chung-ching Hsieh, Guangdong (CN); Xiang Li, Guangdong (CN); Rentang Zhao, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 14/889,901

(22) PCT Filed: Aug. 13, 2015

(86) PCT No.: PCT/CN2015/086876
§ 371 (c)(1),
(2) Date: Apr. 20, 2017

(87) PCT Pub. No.: WO2017/015993
PCT Pub. Date: Feb. 2, 2017

(65) Prior Publication Data
US 2017/0227821 A1    Aug. 10, 2017

(30) Foreign Application Priority Data
Jul. 29, 2015    (CN) .......................... 2015 1 0456706

(51) Int. Cl.
G02F 1/1343    (2006.01)
G02F 1/1337    (2006.01)
(Continued)

(52) U.S. Cl.
CPC ...... *G02F 1/134309* (2013.01); *G02F 1/1337* (2013.01); *G02F 1/1362* (2013.01);
(Continued)

(58) Field of Classification Search
CPC ............ G02F 1/134309; G02F 1/1368; G02F 1/136209; G02F 1/1337; G02F 1/13394
See application file for complete search history.

(56) References Cited

U.S. PATENT DOCUMENTS 6,693,697 B2 * 2/2004 Sakamoto ......... G02F 1/136209
349/106
7,190,419 B2 * 3/2007 Park .................. G02F 1/136209
349/106
(Continued)

FOREIGN PATENT DOCUMENTS

CN    102385196 A    3/2012
CN    104460147 A    3/2015
(Continued)

*Primary Examiner* — Dung T Nguyen
(74) *Attorney, Agent, or Firm* — Andrew C. Cheng

(57) ABSTRACT

The present invention discloses a liquid crystal panel. The liquid crystal panel, comprises: a first substrate, a second substrate opposite to the first substrate, and a liquid crystal layer is disposed between the first substrate and the second substrate. And the liquid crystal panel further comprises: a thin film transistor array and a color resist layer are disposed on the first substrate, and the liquid crystal layer is negative type liquid crystal molecules. As such, the present invention can improve the transmitting rate of the liquid crystal panel.

9 Claims, 3 Drawing Sheets

(51) Int. Cl.
   *G02F 1/1339* (2006.01)
   *G02F 1/1362* (2006.01)
   *G02F 1/1368* (2006.01)
   *G02F 1/137* (2006.01)

(52) U.S. Cl.
   CPC ........ *G02F 1/1368* (2013.01); *G02F 1/13394* (2013.01); *G02F 1/136209* (2013.01); *G02F 2001/13712* (2013.01); *G02F 2001/134372* (2013.01); *G02F 2001/136222* (2013.01); *G02F 2201/121* (2013.01); *G02F 2201/123* (2013.01)

(56) References Cited

U.S. PATENT DOCUMENTS

| | | | |
|---|---|---|---|
| 7,679,693 B2 * | 3/2010 | Park | G02F 1/136204 349/155 |
| 9,588,379 B2 * | 3/2017 | Park | G02F 1/13394 |
| 2009/0141205 A1 | 6/2009 | Park | |
| 2014/0313462 A1 * | 10/2014 | Kibe | G02F 1/134309 349/106 |

FOREIGN PATENT DOCUMENTS

| | | |
|---|---|---|
| CN | 104730770 A | 6/2015 |
| CN | 105093689 A | 11/2015 |

* cited by examiner

LIQUID CRYSTAL PANEL AND LIQUID CRYSTAL DISPLAY DEVICE

BACKGROUND OF THE INVENTION

Field of the Invention

The present invention relates to the field of a liquid crystal display techniques. More particularly, it's related to a liquid crystal and a liquid crystal display.

The Related Arts

FFS (Fringe Field Switching) has been widely used in a small size display. The FFS structure usually disposed a pixel electrode and a common electrode on a lateral side of the thin film transistor array substrate, and a color filter disposed on another substrate. Both of the two substrates have an alignment membrane on the surface, and liquid crystals are aligned laterally by rubbing or photo-alignment technology. When increasing voltage between the pixel electrode and the common electrode, these two electrodes will form a horizontal electric field and the liquid crystal will rotate accordingly to perform the display function. The transmitting rate is one of the most important indicators of the liquid crystal display device, especially for the high resolution display device (>300 ppi). Aperture ratio and RC delay are the key factors to limit the transmitting rate. Because the color filter, the thin film transistor array and the pixel electrode are disposed on the different substrates of the know FFS display, the transmitting rate does not reach the target.

Therefore, this invention provides a liquid crystal display and a liquid crystal panel to solve the technical problems mentioned above.

SUMMARY OF THE INVENTION

The present invention disclosure relates to a liquid crystal display and a liquid crystal panel which can improve the transmitting rate of the liquid crystal panel.

To solve the above problem, the present invention provides one of embodiments of a liquid crystal panel, which comprises: a first substrate, a second substrate opposite to the first substrate, a liquid crystal layer is disposed between the first substrate and the second substrate. The liquid crystal panel further comprises: a thin film transistor array and a color resist layer are disposed on the first substrate, and the liquid crystal layer is negative type liquid crystal molecules. The liquid crystal further comprises: a black matrix is disposed between the color resist layer and a light output surface of the liquid crystal panel, and a light output surface of the liquid crystal panel is the surface of the second substrate away from the first substrate.

To solve the above problem, the present invention provides one of embodiments of a liquid crystal panel, which comprises a first substrate, a second substrate opposite to the first substrate, a liquid crystal layer is disposed between the first substrate and the second substrate. The liquid crystal panel further comprises a thin film transistor array and a color resist layer are disposed on the first substrate, and the liquid crystal layer is negative type liquid crystal molecules.

In one of the embodiments of the present invention, the liquid crystal further comprises a black matrix is disposed between the color resist layer and a light output surface of the liquid crystal panel.

In one of the embodiments of the present invention, the black matrix is disposed on the first substrate.

In one of the embodiments of the present invention, the liquid crystal further comprises a common electrode, an insulating layer, a pixel electrode and a first alignment layer are disposed on the first substrate, a second alignment layer and a supporting layer are disposed on the second substrate. In this embodiment, the thin film transistor array, the color resist layer, the common electrode, the insulating layer are stacked on the first substrate in sequence, the black matrix and the pixel electrode are disposed on the insulating layer, the first alignment layer is disposed on the black matrix and the pixel electrode; the second alignment layer and the supporting layer are stacked on the second substrate in sequence, and the black matrix is supported by the supporting layer.

In one of the embodiments of the present invention, the liquid crystal further comprises: a common electrode, an insulating layer, a pixel electrode, a first alignment layer and a supporting layer are disposed on the first substrate, and a second alignment layer is disposed on the second substrate. In this embodiment, the thin film transistor array, the color resist layer, the common electrode; the insulating layer are stacked on the first substrate in sequence, the black matrix and the pixel electrode are disposed on the insulating layer, the black matrix is supported by the supporting layer, the first alignment layer is disposed on the pixel electrode and the black matrix, and the second alignment layer is also supported by the supporting layer.

In one of the embodiments of the present invention, the black matrix is disposed on the second substrate.

In one of the embodiments of the present invention, the liquid crystal panel further comprises: a common electrode, an insulating layer, a pixel electrode and a first alignment layer are disposed on the first substrate, and a planarizing layer, a second alignment layer and a supporting layer are disposed on the second substrate. In this embodiment, the thin film transistor array, the color resist layer, the common electrode, the insulating layer, the pixel electrode and the first alignment layer are stacked on the first substrate in sequence, the black matrix, the planarizing layer are stacked on the second substrate in sequence, the supporting layer and the second alignment layer are disposed on the planarizing layer, and the first alignment layer is supported by the supporting layer.

In one of the embodiments of the present invention, the liquid crystal panel further comprises: a common electrode, an insulating layer, a pixel electrode, a first alignment layer and a supporting layer are disposed on the first substrate, and a planarizing layer and a second alignment layer are disposed on the second substrate. In this embodiment, the thin film transistor array, the color resist layer, the common electrode, the insulating layer, the pixel electrode and the first alignment layer are stacked on the first substrate in sequence, the black matrix, the planarizing layer and the second alignment layer are stacked on the first substrate in sequence, the supporting layer disposed on the insulating layer, and the second alignment layer is supported by the supporting layer.

In one of the embodiments of the present invention, the color resist layer further comprises a plurality of color resists.

To solve the above problem, the present invention provides one of embodiments of a liquid crystal display, which comprises: a backlight module, and a liquid crystal panel. In this embodiment, the backlight module for lighting to the liquid crystal panel, and the liquid crystal panel comprises: a first substrate, a second substrate opposite to the first substrate, a liquid crystal layer is disposed between the first substrate and the second substrate. The liquid crystal panel further comprises: a thin film transistor array and a color resist layer are disposed on the first substrate, and the liquid crystal layer is negative type liquid crystal molecules.

In one of the embodiments of the present invention, the liquid crystal display further comprises a black matrix is disposed between the color resist layer and a light output surface of the liquid crystal panel.

In one of the embodiments of the present invention, the black matrix is disposed on the first substrate.

In one of the embodiments of the present invention, the liquid crystal display further comprises: a common electrode, an insulating layer, a pixel electrode and a first alignment layer are disposed on the first substrate, and a second alignment layer and a supporting layer are disposed on the second substrate. In this embodiment, the thin film transistor array, the color resist layer, the common electrode, the insulating layer are stacked on the first substrate in sequence, the black matrix and the pixel electrode are disposed on the insulating layer, the first alignment layer is disposed on the black matrix and the pixel electrode, and the second alignment layer and the supporting layer are stacked on the second substrate in sequence, and the black matrix is supported by the supporting layer.

In one of the embodiments of the present invention, the liquid crystal panel further comprises: a common electrode, an insulating layer, a pixel electrode, a first alignment layer and a supporting layer are disposed on the first substrate, and a second alignment layer is disposed on the second substrate. In this embodiment, the thin film transistor array, the color resist layer, the common electrode, the insulating layer are stacked on the first substrate in sequence, the black matrix and the pixel electrode are disposed on the insulating layer; the supporting layer is disposed on the black matrix, the first alignment layer is disposed on the pixel electrode and the black matrix; and the second alignment layer is supported by the supporting layer.

In one of the embodiments of the present invention, the black matrix is disposed on the second substrate.

In one of the embodiments of the present invention, the liquid crystal panel further comprises: a common electrode, an insulating layer, a pixel electrode and a first alignment layer are disposed on the first substrate, and a planarizing layer, a second alignment layer and a supporting layer are disposed on the second substrate. In this embodiment, the thin film transistor array, the color resist layer, the common electrode, the insulating layer, the pixel electrode and the first alignment layer are stacked on the first substrate in sequence, the black matrix, the planarizing layer are stacked on the second substrate in sequence, the supporting layer and the second alignment layer are disposed on the planarizing layer, and the first alignment layer is supported the supporting layer.

In one of the embodiments of the present invention, the liquid crystal panel further comprises: a common electrode, an insulating layer, a pixel electrode, a first alignment layer and a supporting layer are disposed on the first substrate, and a planarizing layer and a second alignment layer are disposed on the second substrate. In this embodiment, the thin film transistor array, the color resist layer, the common electrode, the insulating layer, the pixel electrode and the first alignment layer are stacked on the first substrate in sequence, the black matrix, the planarizing layer and the second alignment layer are stacked on the second substrate in sequence, the supporting layer is disposed on the insulating layer, and the second alignment layer is supported the supporting layer.

In one of the embodiments of the present invention, the color resist layer further comprises a plurality of color resists.

To efficacy of the present invention is that to be distinguished from the state of the art. Through disposed the color resist layer and the thin film transistor array layer on the first substrate, and the liquid crystal layer is negative type liquid crystal molecules so as to improve the transmitting rate of the liquid crystal panel.

BRIEF DESCRIPTION OF THE DRAWINGS

The detailed descriptions accompanying drawings and the embodiment of the present invention are as follows, which allows the technical solutions and other beneficial effects of the present invention more obvious.

DETAILED DESCRIPTION OF THE PREFERRED EMBODIMENTS

In order to more clearly describe the technical solutions and the effects in the present invention, the preferred embodiment of the present invention accompanying drawings are described in detail as follows.

Figure 1:
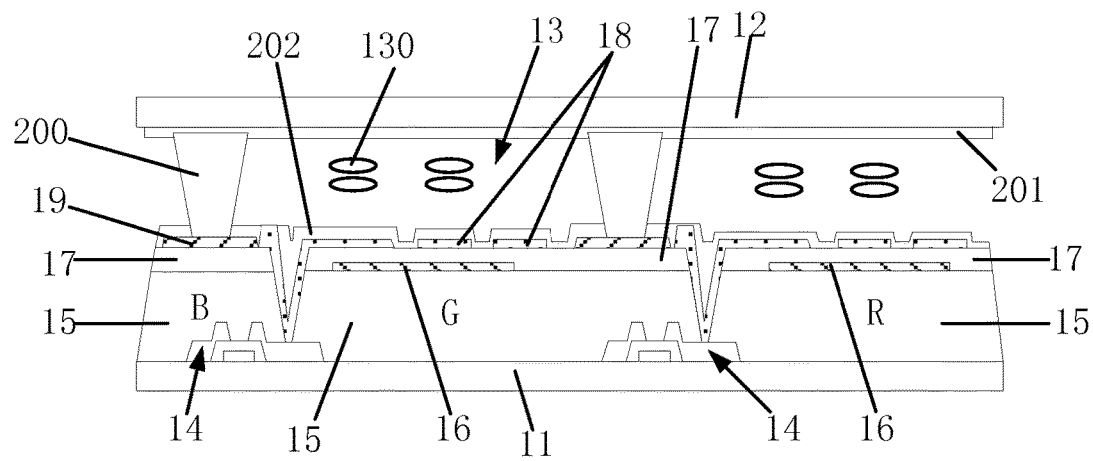
FIG. 1 is a schematic view showing the liquid crystal panel of the first embodiment according to the present invention.

Referring to FIG. 1, FIG. 1 is a schematic view showing the liquid crystal panel of the first embodiment according to the present invention. As show in this embodiment, a liquid crystal panel of the present embodiment comprises a first substrate 11, a second substrate 12 opposite to the first substrate 11, a liquid crystal layer 13 is disposed between the first substrate 11 and the second substrate 12. The liquid crystal panel further comprises a thin film transistor array 14 and a color resist layer 15 which are disposed on the first substrate 11, and the liquid crystal molecules 130 in the liquid crystal layer 13 wherein the liquid crystal molecules 130 are negative type liquid crystal molecules.

Preferably, the liquid crystal panel further comprises a black matrix 19. The black matrix 19 is disposed between the color resist layer 15 and a light output surface of the liquid crystal panel. Preferably, a light output surface of the liquid crystal panel is the surface of the second substrate 12 away from the first substrate 11. In other words, the light output surface is the top surface of the second substrate 12 shown in the FIG. 1, and the light output direction of the liquid crystal panel is the direction from the first substrate 11 to the second substrate 12.

Preferably, the black matrix 19 is disposed on the first substrate 11.

Preferably, the liquid panel further comprises a common electrode 16, an insulating layer 17, a pixel electrode 18 and a first alignment layer 202 are disposed on the first substrate 11, and a second alignment layer 201 and a supporting layer 20 are disposed on the second substrate 12. In the present embodiment, the thin film transistor array 14, the color resist layer 15, the common electrode 16 and the insulating layer 17 are stacked on the first substrate 11 in sequence. The black matrix 19 and the pixel electrode 18 are disposed on the insulating layer 17. The first alignment layer 202 is disposed on the black matrix 19 and the pixel electrode 18. The second alignment layer 201 and the supporting layer 200 are stacked on the second substrate 12 in sequence, and the black matrix 19 is supported by the supporting layer 20. Preferably, forming the supporting layer 200 on the second alignment layer 201 of the second substrate 12, and the supporting layer 200 is supports the black matrix 19, the black matrix 19 is disposed on the first substrate 11. In the present embodiment, the first alignment layer 202 includes a notch can accommodate supporting layer 20, and in the supporting layer 20 has an outer diameter of the nearly side at the first substrate 11, which is smaller than an outer diameter of the nearly side at the second substrate 12.

Preferably, the color resist layer 15 comprises plurality of color resists, R, G, B. The black matrix 19 is adjacently disposed on the position between the two color resists. The black matrix 19 is disposed on the lateral position of the liquid crystal panel.

Figure 2:
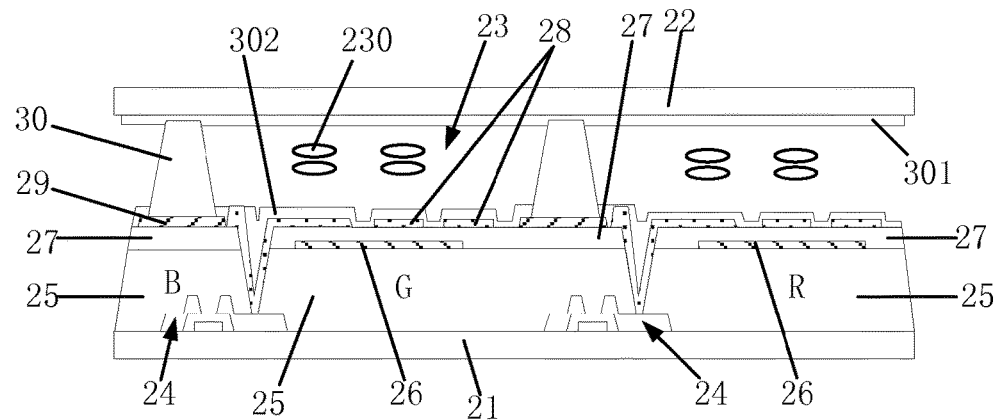
FIG. 2 is a schematic view showing the liquid crystal panel of the second embodiment according to the present invention.

Referring to FIG. 2, FIG. 2 is a schematic view showing the liquid crystal panel of the second embodiment according to the present invention. As show in this embodiment, a liquid crystal panel of the present embodiment comprises: a first substrate 21, a second substrate 22 opposite to the first substrate 21, a liquid crystal layer 23 is disposed between the first substrate 21 and the second substrate 22. The liquid crystal panel also comprises, a thin film transistor array 24 and a color resist layer 25 are disposed on the first substrate 21, and the liquid crystal molecules 230 of the liquid crystal layer 23 is negative type liquid crystal molecules.

Preferably, the liquid crystal panel comprises a black matrix 29. The black matrix 29 is disposed between the color resist layer 25 and a light output surface of the liquid crystal panel. Preferably, the light output surface of the liquid crystal panel is the surface of the second substrate 22 away from the first substrate 21. In other words, the light output surface is the top surface of the second substrate 22 shown in the FIG. 2, and the light output direction of the liquid crystal panel is the direction from the first substrate 21 to the second substrate 22. Preferably, the light output surface of the liquid crystal panel is the surface of the second substrate 22 away from the first substrate 21. In other words, the light output surface is the top surface of the second substrate 22 shown in the FIG. 2, and the light output direction of the liquid crystal panel is the direction from the first substrate 21 to the second substrate 22.

Preferably, the black matrix 29 is disposed on the first substrate 21.

Preferably, the liquid crystal panel further comprises, a common electrode 26, an insulating layer 27, a pixel electrode 28, a first alignment layer 302, a supporting layer 30 are disposed on the first substrate 21, and a second alignment layer 301, the thin film transistor array 24, the color resist layer 25, the common electrode 26, the insulating layer 27 are stacked on the first substrate 21 in sequence. The black matrix 29 and the pixel electrode 28 are disposed on the insulating layer 27. The supporting layer 30 is disposed on the black matrix 29. The first alignment layer 302 disposed on the black matrix 29 and the pixel electrode 28, and the second alignment layer 301 is supported by the supporting layer 30. Preferably, the second alignment layer 301 includes a notch can accommodate supporting layer 30, and the supporting layer 30 has an outer diameter of the nearly side at the first substrate 21, which is larger than an outer diameter of the nearly side at the second substrate 22.

Preferably, the color resist layer 25 comprises plurality of color resists, R, G, B. The black matrix 29 is adjacently disposed on the position between the two color resists. The black matrix 29 is disposed on the lateral position of the liquid crystal panel.

Figure 3:
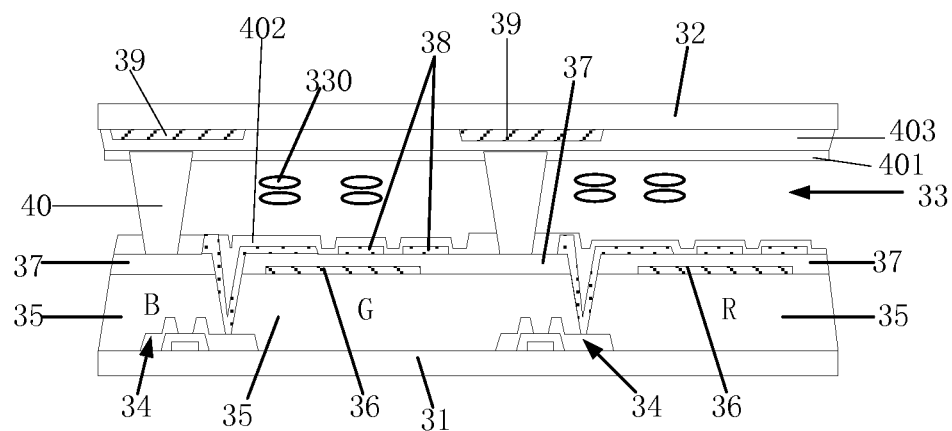
FIG. 3 is a schematic view showing the liquid crystal panel of the third embodiment according to the present invention.

Referring to FIG. 3, FIG. 3 is a schematic view showing the liquid crystal panel of the third embodiment according to the present invention. As show in this embodiment, a liquid crystal panel of the present embodiment comprises: a first substrate 31, a second substrate 32 opposite to the first substrate 31, a liquid crystal layer 33 is disposed between the first substrate 31 and the second substrate 32. Liquid crystal panel further comprises a film transistor array 34 and a color resist layer 35 are disposed on the first substrate 31, and the liquid crystal molecules 330 of the liquid crystal layer 33 is negative type liquid crystal molecules.

Preferably, the liquid crystal panel comprises a black matrix 39. The black matrix 39 is disposed between the color resist layer 35 and a light output surface of the liquid crystal panel. Preferably, the light output surface of the liquid crystal panel is the surface of the second substrate 32 away from the first substrate 31. In other words, the light output surface is the top surface of the second substrate 32 shown in the FIG. 3, and the light output direction of the liquid crystal panel is the direction from the first substrate 31 to the second substrate 32.

Preferably, the black matrix 39 is disposed on the second substrate 32.

Preferably, the liquid crystal panel further comprises a common electrode 36, an insulating layer 37, a pixel electrode 38, a first alignment layer 402 are disposed on the first substrate 31, and a planarizing layer 403, a second alignment layer 401 and the supporting layer 40 are disposed on the second substrate 42. The thin film transistor array 34, the color resist layer 35, the common electrode 36, the insulating layer 37, the pixel electrode 38 and the first alignment layer 402 are stacked on the first substrate 31 in sequence. The black matrix 39 and the planarizing layer 403 are stacked on the second substrate 32 in sequence. The supporting layer 40 and the second alignment layer 401 are disposed on the planarizing layer 403, and the supporting layer 40 used to support the first alignment layer 402. Preferably, the first alignment layer 402 includes a notch can accommodate supporting layer 40, and the supporting layer 40 has an outer diameter of the nearly side at the first substrate 31, which is smaller than an outer diameter of the nearly side at the second substrate 32.

Preferably, the color resist layer 35 comprises plurality of color resists, R, G, B. The black matrix 39 is adjacently disposed on the position between the two color resists. The black matrix 39 is disposed on the lateral position of the liquid crystal panel.

Figure 4:
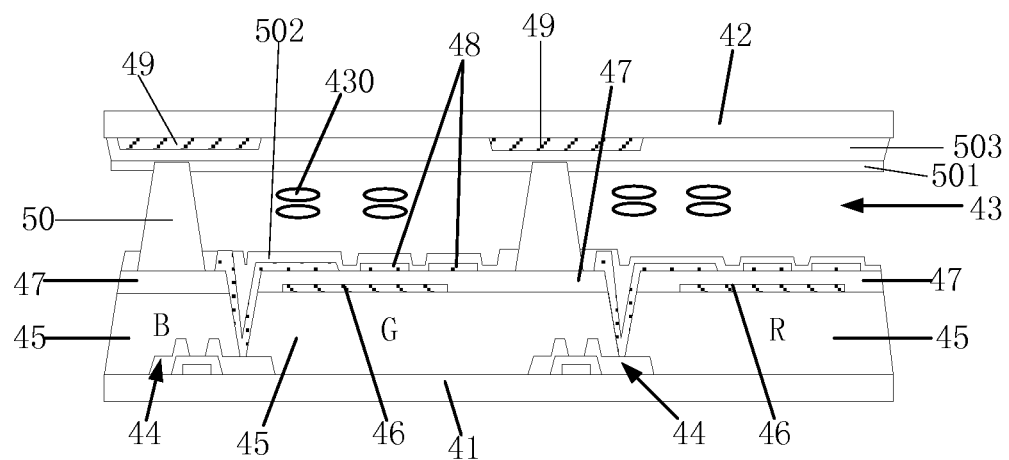
FIG. 4 is a schematic view showing the liquid crystal panel of the forth embodiment according to the present invention.

Referring to FIG. 4, FIG. 4 is a schematic view showing the liquid crystal panel of the forth embodiment according to the present invention. As show in this embodiment, a liquid crystal panel of the present embodiment comprises, a first substrate 41, a second substrate 42 opposite to the first substrate 41, and a liquid crystal layer 43 is disposed between the first substrate 41 and the second substrate 42. Liquid crystal panel further comprises, a film transistor array 44 and a color resist layer 45 are disposed on the first substrate 41, and the liquid crystal molecules 430 of the liquid crystal layer 43 is negative type liquid crystal molecules.

Preferably, the liquid crystal panel comprises a black matrix 49. The black matrix 49 is disposed between the color resist layer 45 and a light output surface of the liquid crystal panel. Preferably, the light output surface of the liquid crystal panel is the surface of the second substrate 42 away from the first substrate 41. In other words, the light output surface is the top surface of the second substrate 42 shown in the FIG. 4, and the light output direction of the liquid crystal panel is the direction from the first substrate 41 to the second substrate 42.

Preferably, the black matrix 49 is disposed on the second substrate 42.

Preferably, the liquid crystal panel further comprises, a common electrode 46, an insulating layer 47, a pixel electrode 48, a first alignment layer 502 are disposed on the first substrate 41, and a planarizing layer 503 and a second alignment layer 501 are disposed on the second substrate 42. The thin film transistor array 44, the color resist layer 45, the common electrode 46, the insulating layer 47, the pixel electrode 48 and the first alignment layer 502 are stacked on the first substrate 41 in sequence. The black matrix 49, the planarizing layer 503 and the second alignment layer 501 are stacked on the second substrate 42 in sequence. The supporting layer 50 is disposed on the insulating layer 47, and the second alignment layer 501 is supported by the supporting layer 50. Preferably, the second alignment layer 501 includes a notch can accommodate supporting layer 50, and the supporting layer 50 has an outer diameter of the nearly side at the first substrate 41, which is larger than an outer diameter of the nearly side at the second substrate 42.

Preferably, the color resist layer 45 comprises plurality of color resists, R, G, B. The black matrix 49 is adjacently disposed on the position between the two color resists. The black matrix 49 is disposed on the lateral position of the liquid crystal panel.

Figure 5:
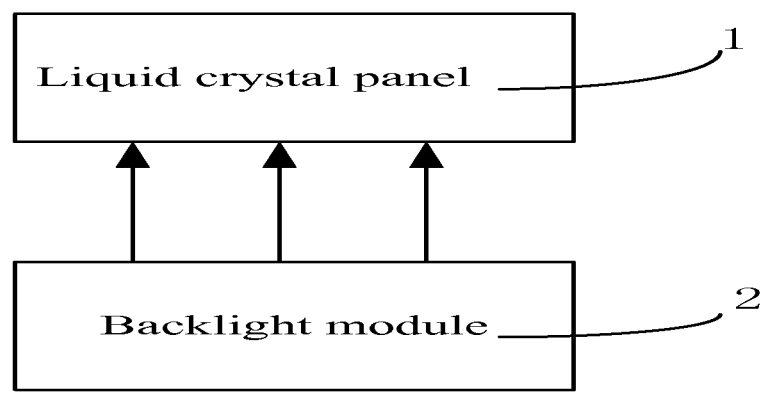
FIG. 5 is a schematic view showing the principle of the liquid crystal display according to the present invention.

Referring to FIG. 5, FIG. 5 is a schematic view showing the principle of the liquid crystal display according to the present invention. As show in this embodiment, a liquid crystal display comprises a backlight module and any one of the liquid crystal panels 1 of the present embodiment, and the backlight module 2 for lighting to the liquid crystal panel 1.

The aforementioned descriptions merely represent the preferred embodiments of instant disclosure, without any intention to limit the scope of the instant disclosure which is fully described only within the following claims. Various equivalent changes, alterations or modifications based on the claims of the instant disclosure are all, consequently, viewed as being embraces by the scope of the instant disclosure.

What is claimed is:

1. A liquid crystal panel, comprising:
a first substrate;
a second substrate opposite to the first substrate;
a liquid crystal layer disposed between the first substrate and the second substrate;
a thin film transistor array and a color resist layer disposed on the first substrate;
a black matrix disposed on the first substrate, and between the color resist layer and the liquid crystal layer so that the black matrix is over a part of the color resist layer to block light transmitted through the color resist layer in a direction perpendicular to a light output surface of the liquid crystal panel;
a supporting layer disposed between the color resist layer and the second substrate;
a first alignment layer disposed on the first substrate, wherein the first alignment layer defines a notch capable of accommodating the supporting layer, one end of the supporting layer abuts the black matrix, and the black matrix is supported by the supporting layer;
wherein the liquid crystal layer is negative type liquid crystal molecules; and
the light output surface of the liquid crystal panel is a surface of the second substrate away from the first substrate.

2. A liquid crystal panel, comprising:
a first substrate;
a second substrate opposite to the first substrate;
a liquid crystal layer disposed between the first substrate and the second substrate;
a thin film transistor array and a color resist layer disposed on the first substrate;
a black matrix being disposed on the first substrate, and between the color resist layer and the liquid crystal layer, being over a part of the color resist layer and blocking light transmitted through the color resist layer in a direction perpendicular to both the first substrate and the second substrate and extended from the first substrate to the second substrate;
a supporting layer disposed between the color resist layer and the second substrate;
a first alignment layer disposed on the first substrate, wherein the first alignment layer defines a notch capable of accommodating the supporting layer, one end of the supporting layer abuts the black matrix, and the black matrix is supported by the supporting layer; and
wherein the liquid crystal layer is negative type liquid crystal molecules.

3. The liquid crystal panel as claimed in claim 2, further comprising:
a common electrode, an insulating layer, and a pixel electrode disposed on the first substrate; and
a second alignment layer disposed on the second substrate;
wherein the thin film transistor array, the color resist layer, the common electrode, the insulating layer are stacked on the first substrate in sequence,
the black matrix and the pixel electrode are disposed on the insulating layer, the first alignment layer is disposed on the black matrix and the pixel electrode, the second alignment layer and the supporting layers are stacked on the second substrate in sequence.

4. The liquid crystal panel as claimed in claim 2, further comprising:
a common electrode, an insulating layer, and a pixel electrode disposed on the first substrate; and
a second alignment layer disposed on the second substrate;
wherein the thin film transistor array, the color resist layer, the common electrode, the insulating layer are stacked on the first substrate in sequence, the black matrix and the pixel electrode are disposed on the insulating layer, the first alignment layer is disposed on the pixel electrode and the black matrix; and the second alignment layer is supported by the supporting layer.

5. The liquid crystal panel as claimed in claim 2, wherein the color resist layer further comprises a plurality of color resists.

6. A liquid crystal display, comprising:
a backlight module; and
a liquid crystal panel;
wherein the backlight module for lighting to the liquid crystal panel, and the liquid crystal panel comprises:

a first substrate;

a second substrate disposed opposite to the first substrate;

a liquid crystal layer disposed between the first substrate and the second substrate;

a thin film transistor array and a color resist layer disposed on the first substrate;

a black matrix being disposed on the first substrate, and between the color resist layer and the liquid crystal layer, being over a part of the color resist layer and blocking light transmitted through the color resist layer in a direction perpendicular to both the first substrate and the second substrate and extended from the first substrate to the second substrate;

a supporting layer disposed between the color resist layer and the second substrate;

a first alignment layer disposed on the first substrate, wherein the first alignment layer defines a notch capable of accommodating the supporting layer, one end of the supporting layer abuts the black matrix, and the black matrix is supported by the supporting layer; and wherein the liquid crystal layer is negative type liquid crystal molecules.

7. The liquid crystal display as claimed in claim 6, further comprising:

a common electrode, an insulating layer, and a pixel electrode disposed on the first substrate; and a second alignment layer disposed on the second substrate;

wherein the thin film transistor array, the color resist layer, the common electrode, the insulating layer are stacked on the first substrate in sequence, wherein the black matrix and the pixel electrode are disposed on the insulating layer, wherein the first alignment layer is disposed on the black matrix and the pixel electrode, wherein the second alignment layer and the supporting layer are stacked on the second substrate in sequence.

8. The liquid crystal panel as claimed in claim 6, further comprising:

a common electrode, an insulating layer, and a pixel electrode disposed on the first substrate; and a second alignment layer disposed on the second substrate;

wherein the thin film transistor array, the color resist layer, the common electrode, the insulating layer are stacked on the first substrate in sequence, the black matrix and the pixel electrode are disposed on the insulating layer, the first alignment layer is disposed on the pixel electrode and the black matrix, and the second alignment layer is supported by the supporting layer.

9. The liquid crystal panel as claimed in claim 6, wherein the color resist layer further comprises a plurality of color resists.

* * * * *